United States Patent
Shaye

[15] 3,677,242
[45] July 18, 1972

[54] AIR BLOCK PREVENTION SYSTEM

[72] Inventor: Nat Shaye, Lindenwold, N.J.
[73] Assignee: Baxter Laboratories Inc., Morton Grove, Ill.
[22] Filed: Jan. 11, 1971
[21] Appl. No.: 105,555

[52] U.S. Cl. .................................128/214 C, 128/227
[51] Int. Cl. .........................................A61m 05/16
[58] Field of Search..............128/213, 214 R, 214 C, 214.2, 128/227, 273, 274

[56] References Cited

UNITED STATES PATENTS

| 926,197 | 6/1909 | Kim | 128/227 |
| 2,800,904 | 7/1957 | Bellato | 128/214 R |
| 2,989,052 | 6/1961 | Broman | 128/214 C |
| 3,001,397 | 9/1961 | Leonard | 128/214 C |
| 3,316,935 | 5/1967 | Kaiser et al. | 137/595 |

FOREIGN PATENTS OR APPLICATIONS

| 1,138,647 | 1/1957 | France | 128/214 C |

Primary Examiner—Dalton L. Truluck
Attorney—W. Garrettson Ellis

[57] ABSTRACT

Air Block Prevention System for intravenous fluid administration sets or the like having a hydrophilic (i.e., wettable) filter utilizes a fluid filled purge line to permit air trapped above the filter when a solution container has run dry to be expressed from the fluid path so as to permit a continuation of fluid delivery to a patient without requiring withdrawal and reinsertion of the needle in the patient and without danger of air embolism.

8 Claims, 7 Drawing Figures

Patented July 18, 1972
3,677,242
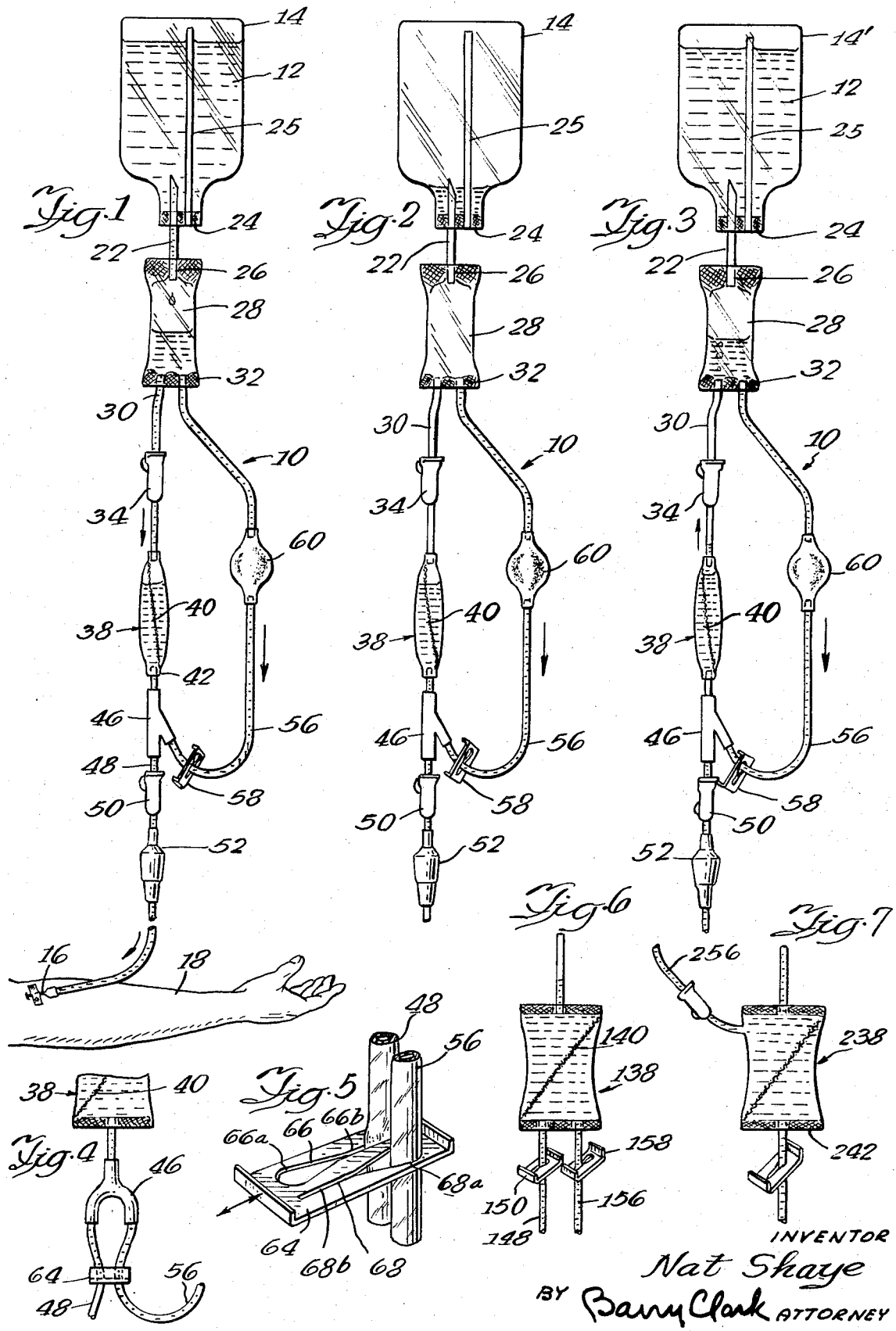
INVENTOR
Nat Shaye
BY Barry Clark ATTORNEY

3,677,242

AIR BLOCK PREVENTION SYSTEM

BACKGROUND OF THE INVENTION

It is often necessary when administering intravenous fluids to provide filtration of the fluid to varying levels of particulate matter removal down to the sub-micron range. Such filtration can be accomplished by the proper choice of filter materials which may include membranes, cloth, paper, wire, a vinyl sheet containing micron sized holes, for example. One problem incident to the administration of parenteral fluids is the elimination of air bubbles from the administration set in order to prevent air embolism. Users of prior art sets for parenteral fluid administration, with or without filters, have had to employ various practices to eliminate air from the set where the solution container has been allowed to run dry after venipuncture has been made, thereby producing a set filled with air. Another problem which arises in administration sets containing hydrophilic filters which are completely wetted when the set is filled is that once the solution container has run dry, an air block can be formed upstream of the filter due to the fact that the air which is behind the fluid cannot pass through the wetted filter. Although such a condition would not permit air to pass through the filter and enter the patient, neither would it permit fluid to flow once a new container of solution was attached to the administration set.

One particularly effective device for eliminating the possibility of an air block automatically is described in U.S. Pat. application Ser. No. 787,141 filed Dec. 26, 1968 and assigned to the assignee of the present application. The aforementioned application discloses a filter comprising a hydrophobic or non-wettable porous membrane in combination with a hydrophilic or wettable porous membrane which automatically permits air in the fluid supply line to the filter to be vented to the atmosphere while only fluid is permitted to pass to the patient. Although such a system is highly desirable, it does have the disadvantage that it requires the use of two filter members and is thus more costly than a system using a single filter member.

SUMMARY OF THE INVENTION

It is an object of the present invention to provide an air block prevention system for intravenous fluid administration sets or the like which permits air to be purged from the system after a solution container has inadvertently run dry. It is a further object of this invention to reduce the probability of air embolism from an intravenous administration set.

An additional object of this invention is to provide a filtration system utilizing only one filter member which can be effectively purged of air.

The filtration system of the present invention achieves the aforementioned objects and avoids the necessity of resorting to various and perhaps questionable practices in order to eliminate air from the set.

In summary, the device incorporates a filter assembly including a hydrophilic filter in a filter chamber which is attached at its upstream end to a drip chamber and associated solution container by means of an upstream fluid line which may include clamp means for clamping such line in a closed or adjustably opened position. Downstream of the filter assembly the fluid normally moves through a downstream fluid line to the patient. Fluid may also move through a purge line which is connected between the filter chamber and the drip chamber. Clamp means on the downstream fluid line and the purge line permit these alternative flow paths to be selectively closed as desired in order to purge the system of air. When first connecting the filter set to a patient and before venipuncture is performed, all clamps are closed and a connector upstream of the drip chamber is connected to the solution container. The drip chamber is then flooded, such as by squeezing it and releasing it to expel air into the solution container which is then displaced by fluid. The downstream fluid line and purge line clamps are then opened in order to eliminate air from the downstream fluid line and the purge line through the needle. The downstream fluid line clamp is then closed while the upstream clamp is opened to expel air bubbles in the upstream fluid line into the drip chamber due to the head of fluid in the purge line. The purge line clamp is then closed, the venipuncture performed, and the downstream fluid line clamp opened while flow is regulated from the upstream clamp.

In the event that the solution bottle runs dry such that the set becomes filled with air in the upstream line above the filter, there is no need to remove the set from the patient's vein since the wetted filter will not allow gas passage until the gas pressure equals or exceeds the bubble point of the particular filter and fluid combination. Since this pressure is much higher than any which the device can produce due to hydrostatic means, the air will be confined to a location above the filter. Since the purge line is filled with fluid due to the purge line clamp having remained closed during administration of fluid to the patient, it is possible to close the downstream line clamp, open the purge line clamp, and thereby use the head of pressure of the fluid in the purge line to cause any air above the filter to be driven up into the drip chamber. If a new solution container is to be attached after an old one has run dry, the procedural steps comprise: closing the downstream clamp; inserting the connector from the drip chamber into the new solution container; flooding the drip chamber; opening the purge line clamp so as to permit the expelling of air from the upstream fluid line into the drip chamber; closing the purge line clamp; and opening the downstream clamp after which the fluid flow may be regulated with the upstream clamp.

BRIEF DESCRIPTION OF THE DRAWINGS

FIG. 1 is a diagramatic representation of my air block prevention system showing a solution properly flowing to a patient;

FIG. 2 is a view similar to FIG. 1 but showing the system when the solution container has run dry;

FIG. 3 is a view similar to FIGS. 1 and 2 but showing the system after a new solution container has been attached and the air block is being removed;

FIG. 4 is a fragmentary diagramatic view of a portion of the apparatus of FIG. 1 showing a modified form of clamp arrangement;

FIG. 5 is a perspective view showing the relationship between the modified clamp of FIG. 4 and the tubes with which it cooperates;

FIG. 6 is a fragmentary diagramatic view similar to FIG. 4 but showing a modified arrangement wherein the lower tubes are separately connected to the filter; and FIG. 7 is a fragmentary diagramatic view similar to FIG. 4 but showing a modified form of tubing arrangement wherein the purge line is connected to the upstream fluid line.

DESCRIPTION OF THE PREFERRED EMBODIMENTS

In FIG. 1 my air block prevention system for an intravenous fluid administration set indicated generally at 10 is diagramatically illustrated. An intravenous solution 12 contained in a container such as a bottle 14 is carried by the administration set 10 through a needle 16 and into a patient 18. A connector member 22 has an upper end which passes through a container seal member 24 which also carries an air vent tube 25. The lower end of the connector passes through a top portion 26 of a drip tube 28 which has an upstream fluid line 30 attached to its bottom portion 32. The upstream fluid line 30, which is preferably plastic tubing, has mounted upon it an upstream fluid line clamp member 34 which is preferably of a type which will allow the fluid flow through the apparatus to be precisely controlled. At the lower end of upstream fluid line 30 the fluid line is connected to the top portion of a filter chamber indicated generally at 38. The filter chamber 38 contains a hydrophilic or wettable filter member 40 which is preferably a membrane having the degree of porosity desired. Out of the lower end 42 of filter chamber 38 an inverted Y-shaped connector member 46 extends. Attached to one leg of the Y-connector 46 is a fluid line 48 through which fluid 12 from the solution container 14 may be delivered to the patient. A downstream fluid line clamp 50 permits the flow through the line 48 to be turned on or off as desired. An injection site 52 may be placed in the fluid line 48 for the injection of medicines as desired.

A purge line 56 is attached to the other leg of the inverted Y-connector member 46 and carries a clamp member 58 for blocking the flow of fluid through the purge line when desired. The purge line 56 also preferably includes a squeeze pump member 60 which may be used to initiate movement of fluid in the purge line when necessary.

In initially connecting the administration set 10 to a patient, all of the clamps 34, 50 and 58 are closed while the connector 22 is inserted into the bottle 14. The drip chamber 28, which is preferably made of a resilient material such as plastic, is then squeezed so as to force air upwardly through the connector 22 into the container 14 so that the solution 12 can displace the air and substantially flood the drip chamber 28. The downstream fluid line and purge line clamps 50, 58 are then opened so that fluid will flow through purge line 56 and out through downstream fluid line 48 and needle 16 to expel all air bubbles which are either in the purge line, the downstream fluid line, or beneath the filter 40. The downstream fluid line clamp 50 is then closed and the upstream fluid line clamp 34 is opened so that all air bubbles which are above the filter member 40 in the filter chamber 38 or in the upstream fluid line 30 will be expelled into the drip chamber 28. At this point, the purge line clamp 58 is closed. The venipuncture is then performed with the needle 16 after which the downstream fluid line clamp 50 is opened and the flow of solution to the patient regulated by partially opening the upstream fluid line clamp 34.

Should the solution container 14 inadvertently run dry as shown in FIG. 2 there is no possibility of air being injected into the patient since the hydrophilic filter member 40 can only pass liquid. If the empty solution container 14 shown in FIG. 2 is replaced by a fresh container 14' it can be readily appreciated that the solution cannot readily flow to the patient since the narrow internal dimension of upstream fluid line 30 cannot allow the upward flow of air and the downward flow of liquid which would be necessary to get the system flowing properly. To overcome the air block which is present in upstream fluid line 30, the pressure head of the fluid column within purge line 56 may be utilized in the manner shown in FIG. 3. Referring to FIG. 3, the connector 22 is placed within a fresh container of solution 14' and the downstream fluid line clamp 50 is closed. The drip chamber 28 is then flooded by squeezing it as previously explained in connection with FIG. 1. By opening the purge line clamp 58 the fluid in purge line 56 will move downwardly in the purge line 56, up through the filter chamber 38 and upwardly through the upstream fluid line 30 until all of the air above the filter membrane 40 has been expelled upwardly into the drip chamber 28. At this point, the purge line clamp 58 is closed and the downstream fluid line clamp 50 is opened so as to permit fluid to flow to the patient under the control of upstream clamp 34. A squeeze pump 60 may be placed in the purge line 56 to assist the movement of the purge line fluid.

Although FIGS. 1 through 3 illustrate the basic concept of my invention they utilize certain specific structural details for which other structures could be substituted. Whereas FIGS. 1-3 show separate clamps 50, 58 connected to the downstream fluid line 48 and the purge line 56 it would be possible to substitute therefore a single double-acting clamp 64 as shown in FIGS. 4 and 5. The clamp 64 is a simple stamped metal or molded plastic member having a pair of generally key shaped slots 66, 68 which have opposed large ends 66a, 68a and extended thin portions 66b, 68b. By holding both of the tubes 48, 56 and moving the clamp member 64 in the direction of its slots 66, 68 the flow through one tube may be progressively closed off and will remain closed off as the flow through the other tube is progressively increased. This particular type of clamp arrangement is not only economical but it insures that there is no chance that flow can take place through tubes 48 and 56 at one time such that the purge line fluid could be lost. When using the dual purpose clamp 64 a slightly different operating procedure is necessary than that previously described since the clamp 64 does not permit each of the lines 48 and 56 to be both open at one time. The procedure for feeding an initial bottle of solution to a patient is as follows: Slide clamp 64 such that purge line 56 is closed and downstream line 48 is opened. Close upstream clamp 34. Insert connector 22 into container 14. Squeeze drip chamber 28 until flooded with solution. Hold needle 16 in an upright position. Open upstream clamp 34 so as to fill the set and expel all air bubbles through the downstream line. Slide dual purpose clamp 64 such the downstream line 48 is closed and the purge line 56 is opened and expel all air from the purge line 56 into the drip chamber 28. Close purge line 56 with dual purpose clamp 64. Close upstream clamp 34 and perform venipuncture. Regulate flow with upstream clamp 34.

If the set becomes filled with air due to allowing a container 14 to run dry, the following steps are to followed: Close upstream clamp 34. Insert connector 22 into new solution container 14'. Squeeze drip chamber 28 until flooded with solution. Open upstream clamp 34 and slide dual-purpose clamp 64 such that downstream fluid line 48 is closed and purge line 56 is opened. thus purging all air from upper portion of filter chamber 38 and upstream fluid line 30 into drip chamber 28. Close purge line 56 and open line 48 using dual-purpose clamp 64 and regulate flow to patient using upstream clamp 34.

FIG. 6 illustrates a slight modification of the invention in that the Y-shaped connector 46 shown in FIGS. 1 through 3 is eliminated in favor of separate connections of the downstream fluid line 148 and the purge line 156 through the bottom portion 142 of the filter chamber 138. The filter member 140 and the clamps 150, 158 may be identical to the filter member 40 and the clamps 50, 58 shown in FIG. 1.

FIG. 7 shows a modification wherein the purge line 256 is connected to the top of the filter chamber 238 rather than to the bottom 242. The operational procedure is identical to that shown in FIG. 1-3 or 6.

I claim:

1. In an intravenous fluid administration apparatus having a drip chamber for receiving a solution from a solution container and a downstream fluid carrying member for carrying the solution to a patient, the improvement comprising: a hydrophilic filter member in a filter chamber connected in the fluid path between said drip chamber and said downstream fluid carrying member, a purge line connected between said drip chamber and said filter chamber, purge line clamp means for having a closed position for permitting said purge line to be filled with said solution and maintained filled even though the solution container runs dry and the fluid path between said drip chamber and said filter member becomes filled with air, said purge line clamp means further having an open position permitting the release of the fluid in said purge line into said filter chamber after an exhausted solution container has been replaced so as to cause any air in said apparatus upstream of said filter member to be driven upwardly into said drip chamber.

2. The intravenous fluid administration apparatus of claim 1 wherein said purge line includes a squeeze pump for assisting in initiating fluid flow therethrough when said purge line clamp means is released.

3. The intravenous fluid administration apparatus of claim 1 wherein said apparatus includes a clamp for stopping flow in said downstream fluid carrying member when said purge line clamp means is in its open position.

4. The intravenous fluid administration apparatus of claim 3 and further including a clamp in the fluid line between said drip chamber and said filter member for cutting off the flow in said line or adjustably regulating it.

5. The intravenous fluid administration apparatus of claim 3 wherein said purge line and said downstream fluid carrying member comprise two legs of a Y-connection to said filter chamber.

6. The intravenous fluid administration apparatus of claim 3 wherein said purge line and said downstream fluid carrying member are separately connected to said filter chamber.

7. The intravenous fluid administration apparatus of claim 3 wherein said purge line is connected to said filter chamber upstream of said filter member.

8. The intravenous fluid administration apparatus of claim 3 wherein said purge line clamp means and said clamp for stopping flow in said downstream fluid carrying member are integrally formed so that fluid can flow in one line at a time.

* * * * *